(12) United States Patent
Barnes

(10) Patent No.: US 12,270,425 B2
(45) Date of Patent: Apr. 8, 2025

(54) SUSPENSION ASSEMBLY

(71) Applicant: GRIPPLE LIMITED, Sheffield (GB)

(72) Inventor: Samuel Barnes, Sheffield (GB)

(73) Assignee: GRIPPLE LIMITED (GB)

( * ) Notice: Subject to any disclaimer, the term of this patent is extended or adjusted under 35 U.S.C. 154(b) by 0 days.

(21) Appl. No.: 18/025,265

(22) PCT Filed: Sep. 29, 2021

(86) PCT No.: PCT/IB2021/058888
§ 371 (c)(1),
(2) Date: Mar. 8, 2023

(87) PCT Pub. No.: WO2022/070055
PCT Pub. Date: Apr. 7, 2022

(65) Prior Publication Data
US 2024/0026910 A1    Jan. 25, 2024

(30) Foreign Application Priority Data

Oct. 1, 2020 (GB) .................................. 2015576
Sep. 2, 2021 (GB) .................................. 2112488
Sep. 28, 2021 (GB) .................................. 2113824

(51) Int. Cl.
*F16B 2/10* (2006.01)
*F16G 11/10* (2006.01)
*H02G 7/08* (2006.01)

(52) U.S. Cl.
CPC ............... *F16B 2/10* (2013.01); *F16G 11/10* (2013.01); *H02G 7/08* (2013.01)

(58) Field of Classification Search
CPC .. F16B 2/10; F16G 11/10; H02G 7/08; H02G 1/04; H02G 7/12
USPC .......................................................... 248/324
See application file for complete search history.

(56) References Cited

U.S. PATENT DOCUMENTS

| | | | | |
|---|---|---|---|---|
| 955,070 | A | * | 4/1910 | Honabach ............... F16G 13/12 24/598.5 |
| 1,102,126 | A | | 6/1914 | Barnes |
| 1,754,042 | A | * | 4/1930 | Port ........................ F16G 15/04 59/87 |
| 2,004,695 | A | | 6/1935 | Hager |
| 2,795,024 | A | * | 6/1957 | Donaldson .............. B60C 27/08 24/598.5 |
| 2,817,556 | A | * | 12/1957 | White ...................... F16B 45/06 294/116 |

(Continued)

FOREIGN PATENT DOCUMENTS

GB            783796 A      10/1957

*Primary Examiner* — Kimberly T Wood
(74) *Attorney, Agent, or Firm* — Clark Hill PLC; James R. Foley

(57) ABSTRACT

A suspension assembly (14) comprises first and second suspension members (10, 12). The suspension assembly (14) further includes a pivot member (24) on which the first and second suspension members (10, 12) are pivotally mounted. Each of the first and second suspension members (10,12) defines clamping recess (30) for receiving an article (16). Each of the first and second suspension members (10, 12) also defines an elongate aperture (28) for effecting pivoting movement of at least one of the first and second suspension members (10, 12) to clamp the article in the clamping recesses (30).

19 Claims, 17 Drawing Sheets

(56) References Cited

U.S. PATENT DOCUMENTS

| | | | | |
|---|---|---|---|---|
| 3,072,987 | A | * | 1/1963 | Winters ................ F16B 45/026 |
| | | | | 24/598.5 |
| 3,161,724 | A | | 12/1964 | Greene, Jr. et al. |
| 3,586,292 | A | * | 6/1971 | Buck ........................ H02G 7/12 |
| | | | | 29/749 |
| 3,590,443 | A | * | 7/1971 | Kubsch ................ F16B 45/035 |
| | | | | 24/598.5 |
| 5,440,789 | A | * | 8/1995 | Lofland ................ F16G 11/101 |
| | | | | 24/132 R |
| 9,551,438 | B2 | * | 1/2017 | Frizzell ..................... F16L 3/23 |
| 2010/0261390 | A1 | * | 10/2010 | Gardner .................. H01R 4/40 |
| | | | | 439/775 |
| 2021/0123545 | A1 | * | 4/2021 | Tsai ...................... F16L 3/1075 |

* cited by examiner

SUSPENSION ASSEMBLY

This invention relates to suspension assemblies. More particularly, but not exclusively, this invention relates to suspension assemblies for suspending articles from supports. This invention may also relate to suspension assemblies for suspending articles from elongate supports in the form of, for example, wires, wire ropes, cables or the like. Embodiments of the invention relate to suspension assemblies for suspending articles from elongate supports in the form of catenary wires, catenary wire ropes, catenary cables or the like. Embodiments of the invention relate to suspension assemblies for connecting droppers to catenary wires of cable systems, such as in railway lines or in agricultural situations. This invention may also relate to suspension assemblies for suspending supports, such as catenary wires, catenary wire ropes, catenary cables or the like.

Electrified overhead cables for railway lines comprise a catenary wire (known as a "messenger wire" in the art) which is joined to a contact cable by a hanging assembly (known as a "dropper" in the art). Conductive manual clamps connect the dropper to the catenary wire. The manual clamps can be difficult to install.

Similarly, in agricultural and other applications, it is often necessary to support catenary wires from above by cables, or to suspend articles from cables attached to catenary wires. In present such applications, the catenary wires may be attached to the cables by tightly winding strands of wire around the catenary wire and the cable.

According to one aspect of this invention, there is provided a suspension assembly comprising:
  first and second suspension members; and
  a pivot member on which the first and second suspension members are pivotally mounted;
  each of the first and second suspension members defining a clamping recess for receiving an article;
  wherein each of the first and second suspension members defines an elongate aperture for effecting pivoting movement of at least one of the first and second suspension members to clamp the article in the clamping recesses.

According to another aspect of this invention, there is provided a support assembly comprising a suspension assembly as described above, and an article received by the clamping recesses of the first and second suspension members.

According to another aspect of this invention, there is provided a support assembly comprising a suspension assembly as described above, and a connecting arrangement received through at least one of the first and second apertures.

The article may be a support. The article may be an elongate article. The support may be elongate.

The first and second suspension members may extend across each other. The first and second suspension members may overlap each other.

The clamping recesses may align with each other to provide a clamping region defined by the first and second suspension members. The clamping recesses may align with each other to hold the support in the clamping region.

The first and second suspension members may be pivotally movable from a released position of the first and second suspension members to a clamping position of the first and second suspension members.

Said pivoting movement of the first and second suspension members may cause a closing movement of the clamping recesses. Said closing movement of the first and second suspension members to the clamping position may close the clamping recesses.

The closing movement of the clamping recesses cause the support to be clamped by the first and second suspension members.

The article may be an elongate support. The elongate support may be a wire, wire rope, cable or the like. The elongate support may be a catenary wire, or messenger wire, of a cable system, such as for a railway line, or for an agricultural or other industrial application.

The suspension assembly may be attached or attachable to a connecting arrangement. The connecting arrangement may comprise an elongate member. The elongate member may be a wire, wire rope, cable or the like. The connecting arrangement may be a dropper of a cable system, such as for a railway line, or of a cable system for use in agricultural or industrial situations.

Each pivot member may be provided at one end region of the respective first or second suspension members. Each elongate aperture may be defined in an opposite end region of the respective first or second suspension members.

Each pivot member may be provided at an upper region of the respective first or second suspension members. Each elongate aperture may be defined in a lower region of the respective first or second suspension members. Each elongate aperture may have proximal and distal ends. The proximal end may be closest to the pivot member.

The proximal end of the elongate aperture of each of the first and second suspension members may be arranged closest to the clamping recess. The distal end may be furthest from the clamping recess.

The proximal and distal ends of the elongate aperture of the first suspension member may be closed ends. The proximal and distal ends of the elongate aperture of the second suspension member may be closed ends.

In another embodiment, the second suspension member may define an opening at the proximal end of the elongate aperture. The opening may provide communication into the aperture through which at least a portion of the connecting arrangement may enter the aperture defined by the second suspension member.

The first suspension member may define an opening at the proximal end of the elongate aperture. The opening may provide communication into the aperture through which at least a portion of the connecting arrangement may enter the aperture defined by the first suspension member.

Each clamping recess may be defined in a central region of the respective first or second suspension members. Each clamping recess may be defined between the elongate aperture and the pivot member of the respective first and second suspension members. Desirably, each clamping recess is defined between the proximal end of the elongate aperture and the pivot member of the respective first and second suspension members.

In other versions of the suspension assembly, each clamping recess may be defined at one or other of the opposite end regions of the respective suspension members. In one version, each pivot hole may be defined in the respective suspension member between the clamping recess and the elongate aperture. In another version, each elongate aperture may be defined in the respective suspension member between the clamping recess and the pivot hole.

The first and second suspension members may be pivotally movable from a released position of the first and second suspension members to a clamping position of the first and second suspension members. In the released position of the first and second suspension members, the first and second suspension members may hold the support loosely in the clamping recesses. In the clamping position of the first and second suspension members, the first and second suspension members may clamp the support in the clamping recesses.

Each of the first and second suspension members may have a leading edge and a trailing edge opposite the leading edge. The leading edge of each of the first and second suspension members may lead the respective suspension member when the suspension members are moved to the clamping position of the first and second suspension members.

Each elongate aperture may extend from the proximal end towards the trailing edge of the respective suspension member.

The pivoting movement of the first and second suspension members from the released position to the clamping position may cause the first and second suspension members to overlap each other to a greater extent.

In the released position of the first and second suspension members, the clamping recesses are further apart than when the first and second suspension members are in the clamping position.

The clamping recesses may face in opposite directions. The clamping recesses may overlap each other. The overlapping clamping recesses may provide a holding region in which the support is held.

Each of the first and second suspension members may have an outer edge defining a gap to provide communication between the region within the clamping recess and the region external thereof. Each of the first and second suspension members may have an inner edge defining the respective clamping recess. The inner edge of the first suspension member may face the inner edge of the second suspension member.

The closing movement of the clamping recesses may cause the edges of the clamping recesses to engage the support. In the clamping position of the first and second suspension members, the edges of the clamping recesses may be in clamping engagement with the support.

Each elongate aperture may receive an engaging portion of the connecting arrangement in an aligned condition of the proximal ends of each elongate aperture. The engaging portion of the connecting arrangement may extend through each of the elongate apertures at the proximal end thereof.

The proximal ends of the elongate apertures may be in an aligned condition in the released position of the suspension members. The aligned proximal ends of the elongate apertures may receive a portion of the connecting arrangement.

The distal ends of the elongate apertures may be in an aligned condition in the clamping position of the suspension members. The aligned distal ends of the elongate apertures may receive a portion of the connecting arrangement.

When the first and second suspension members move from the aligned condition of said proximal ends to the aligned condition of said distal ends, the first and second suspension members may move from the released position to the clamping position.

The connecting arrangement may have a looped region. The looped region may be a looped end region. The looped region may be the aforesaid engaging portion. The looped region may extend through the aperture of the first suspension member.

In the embodiment in which the second suspension member has an opening at the proximal end of the aperture, at least a portion of the engaging portion may be received into the aperture via the opening. This provides the advantage in the embodiment described herein that it obviates the need to thread the elongate member through the aperture. In this embodiment, the first suspension member is provided with the engaging portion of the connecting arrangement extending through the aperture in the first suspension member.

The engaging portion of the connecting arrangement may move along the elongate apertures of each of the first and second suspension members from the proximal end to the distal end. Movement of the engaging portion of the connecting arrangement along the elongate apertures from the proximal ends to the distal ends may effect pivoting movement of the first and second suspension members relative to each other.

Said pivoting movement of the first and second suspension members may move the distal ends of the elongate apertures into alignment with each other to allow the engaging portion of the connecting arrangement to move to the distal end. Thus, in the embodiment described herein, when the engaging portion of the connecting arrangement is received at the distal ends of each elongate aperture the distal ends are aligned with each other.

The elongate aperture of each of the first and second suspension members may extend diagonally across the respective first or second suspension member. Each elongate aperture may extend diagonally relative to a straight line through the centre of the respective pivot member and the centre of gravity of the respective elongate aperture.

Each of the aforesaid straight lines may extend through the centre of the proximal end of the respective elongate aperture. Each of the aforesaid straight lines may extend through the clamping recess of the respective first and second suspension members.

For each of the first and second suspension members, the angle between the elongate aperture and the aforesaid straight line may be less than 180°. The angle between the elongate aperture and the aforesaid line may be between 180° and 160°. The angle between the elongate aperture and the aforesaid line may be substantially 170°.

The elongate aperture defined by the first suspension member may be angled in the opposite direction to the elongate aperture defined by the second suspension member. The first and second suspension members may be pivotally movable towards each other.

Each of the first and second suspension members may define a pivot hole through which the pivot member may extend. The pivot member may pivotally attach the first and second suspension members to each other.

The suspension assembly may comprise two of the first suspension members. The first suspension members may have the same orientation as each other.

The second suspension member may be sandwiched between the two first suspension members. Both of the first suspension members may be pivotally mounted on the pivot member.

At least one embodiment of the invention will now be described by way of example only, with reference to the accompanying drawings, in which.

Figure 1:
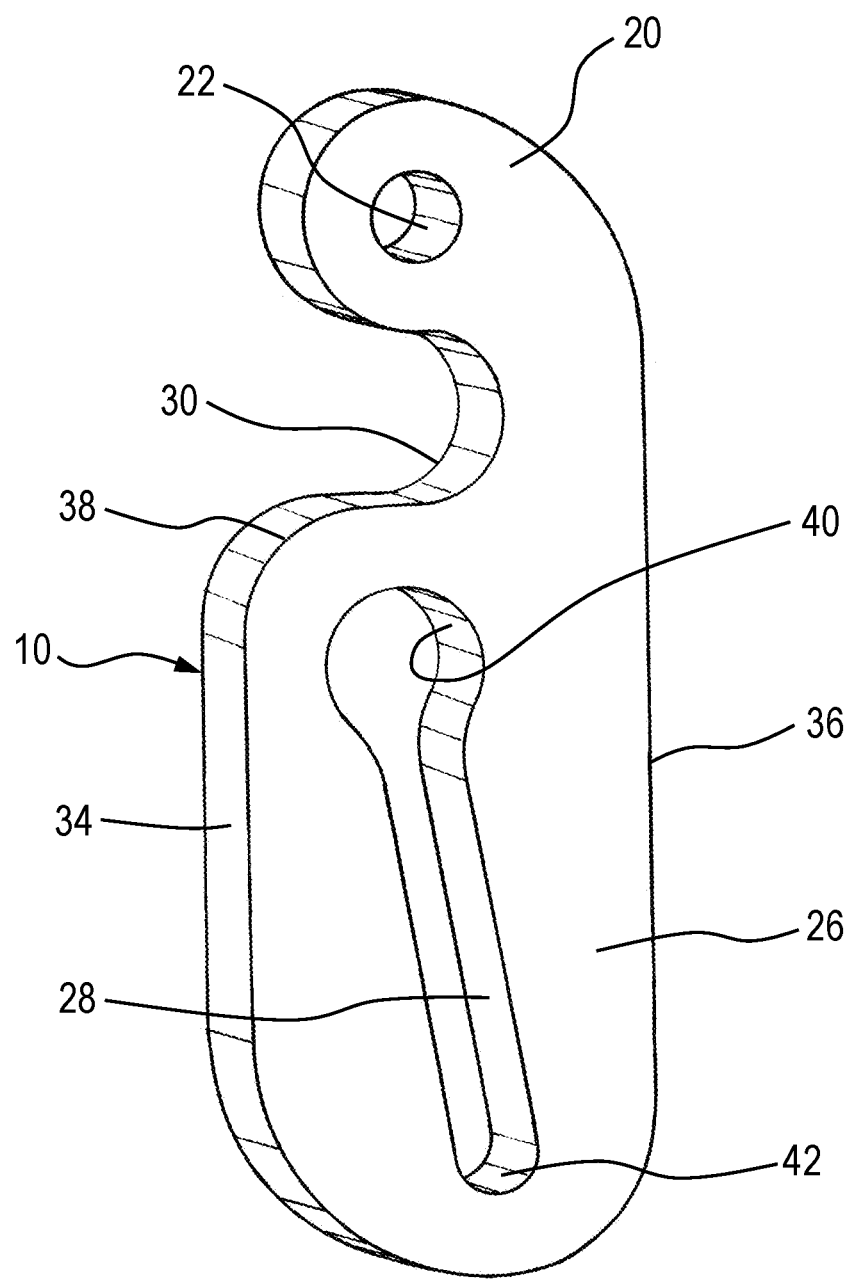
FIG. 1 is a perspective view of a suspension member of a suspension assembly.
Figure 2:
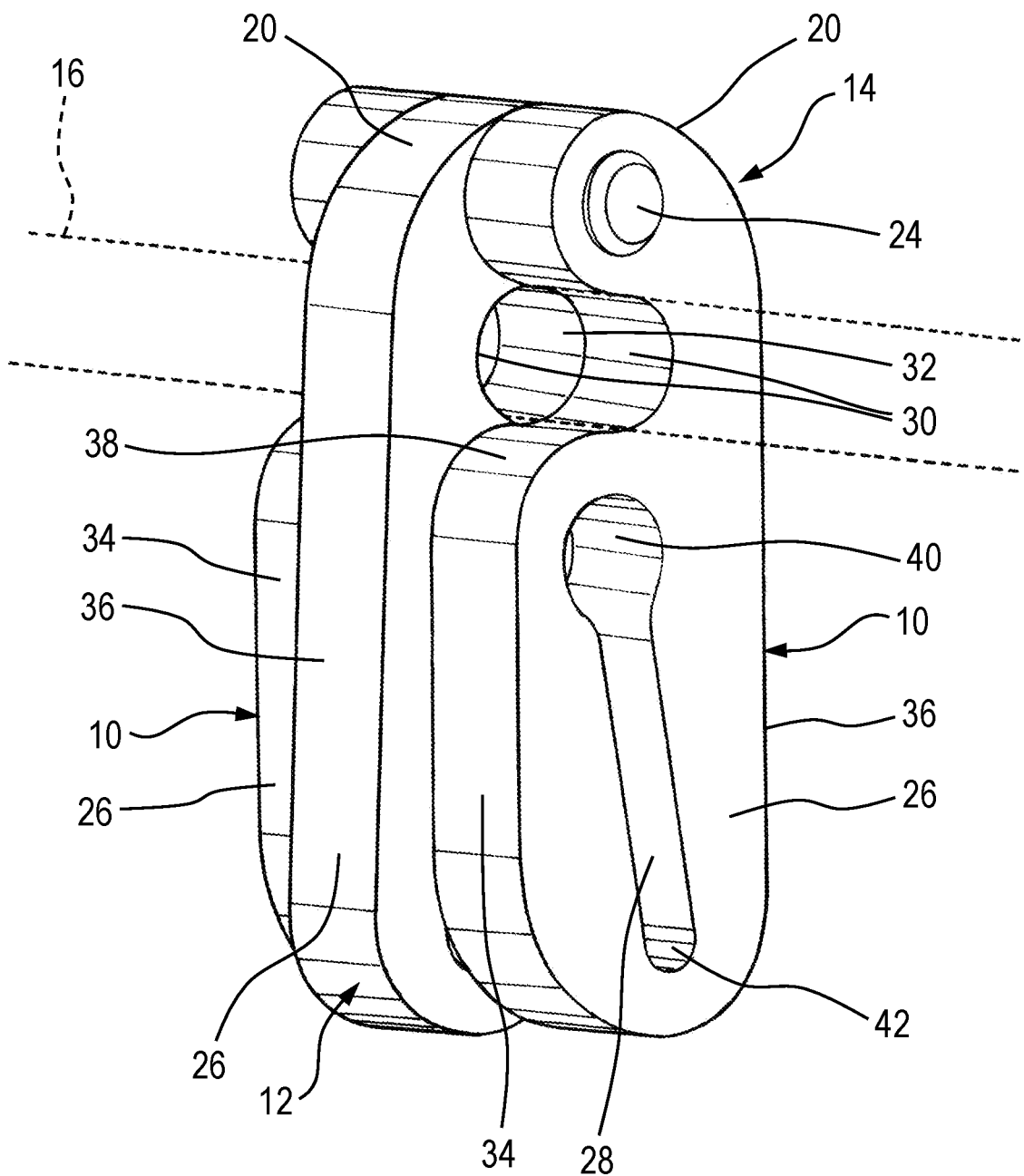
FIG. 2 is perspective view of a suspension assembly comprising first and second suspension members.

Referring to FIGS. 1 to 7, FIG. 1 shows a first suspension member 10 for use along with a second suspension member 12 in a suspension assembly 14 shown in FIG. 2. The suspension assembly 14 comprises two of the first suspension members 10 and one of the second suspension members 12 sandwiched between the two first suspension members 10.

The suspension assembly 14 may, if desired comprise one of the first suspension members 10 and one of the second suspension members 12.

It will be appreciated that the suspension assembly 14 may comprise any suitable number of the first and second suspension members 12.

The suspension assembly 14 is used for clamping an elongate article 16. The elongate article 16 may be in the form of a catenary wire, or messenger wire, on an overhead electrical cable system of a railway line. The suspension assembly 14 may be used for suspending a connecting arrangement 18 from the elongate article 16, so that the connecting arrangement 18 is supported by the suspension assembly 14. Alternatively, the connecting arrangement 18 may support the suspension assembly 14.

In one use of the embodiments described herein, the elongate article 16 may be a catenary wire, catenary wire rope or catenary cable in an agricultural or other situation, for example for supporting crops or industrial equipment, such as light fittings.

The connecting arrangement 18 may comprise an elongate wire, cable or the like.

In FIGS. 1 to 7, the first and second suspension members 10, 12 are identical to each other. However, it will be appreciated that the first and second suspension members 10, 12 could be different from each other (see, for example, FIGS. 8 to 15, discussed below). It will also be appreciated that the two first suspension members 10 could be different from each other.

Each of the first and second suspension members 10, 12 has an upper region 20 defining a pivot hole 22, and a lower region 26 defining an elongate aperture 28. A clamping recess 30 is defined in each of the first and second suspension members 10, 12. The clamping recess 30 of each of the first and second suspension members 10, 12 is defined between the pivot hole 22 and the elongate aperture 28.

A pivot member 24 extends through the pivot holes 22 of each of the first and second suspension members 10, 12, thereby allowing the first and second suspension members 10, 12 to pivot relative to each other.

The first suspension members 10 are arranged in an opposite orientation to the second suspension member 12. The clamping recesses 30 defined by both first suspension members 10 are aligned with the clamping recess 30 of the second suspension member 12.

Figure 3:
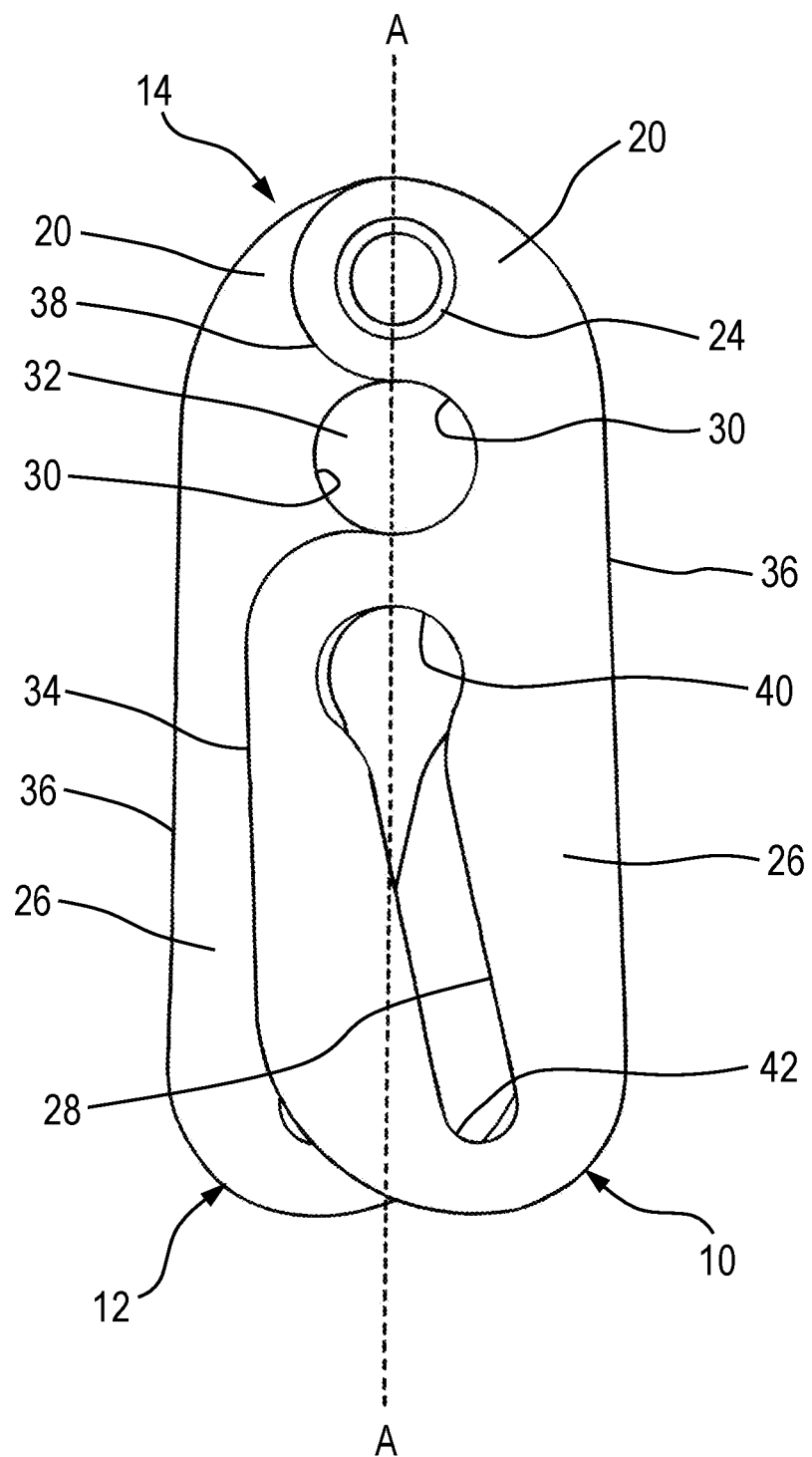
FIG. 3 is a front view of the suspension assembly.

As shown in FIGS. 2 and 3, the clamping recesses 30 of both first suspension members 10 face in the opposite direction to the clamping recess 30 of the second suspension member 12. As a result, when the clamping recesses 30 overlap and are aligned with each other the clamping recesses 30 form a clamping region 32 for holding the elongate article 16. The first and second suspension members 10, 12 constitute offset clamping members to clamp the elongate article 16 in the clamping region 32.

Figure 4:
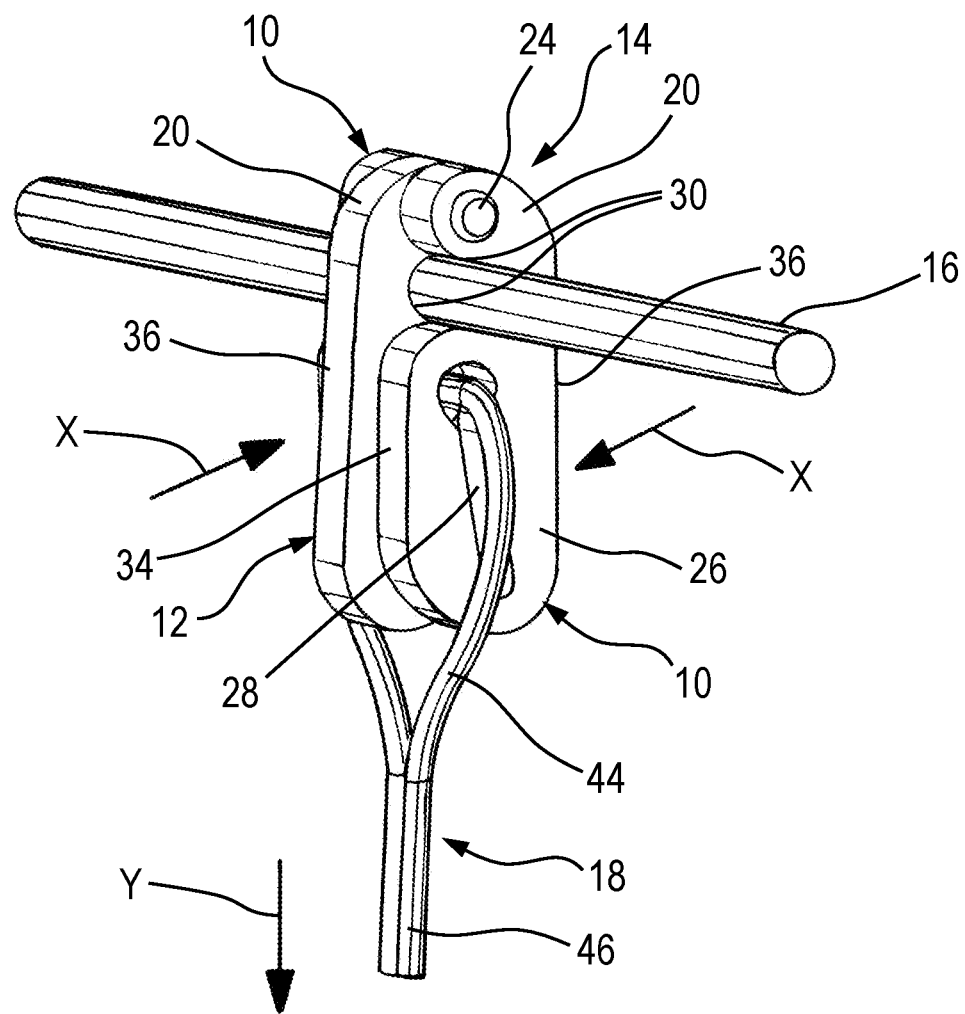
FIG. 4 is a perspective view of the suspension assembly suspending a connecting arrangement on a support.
Figure 5:
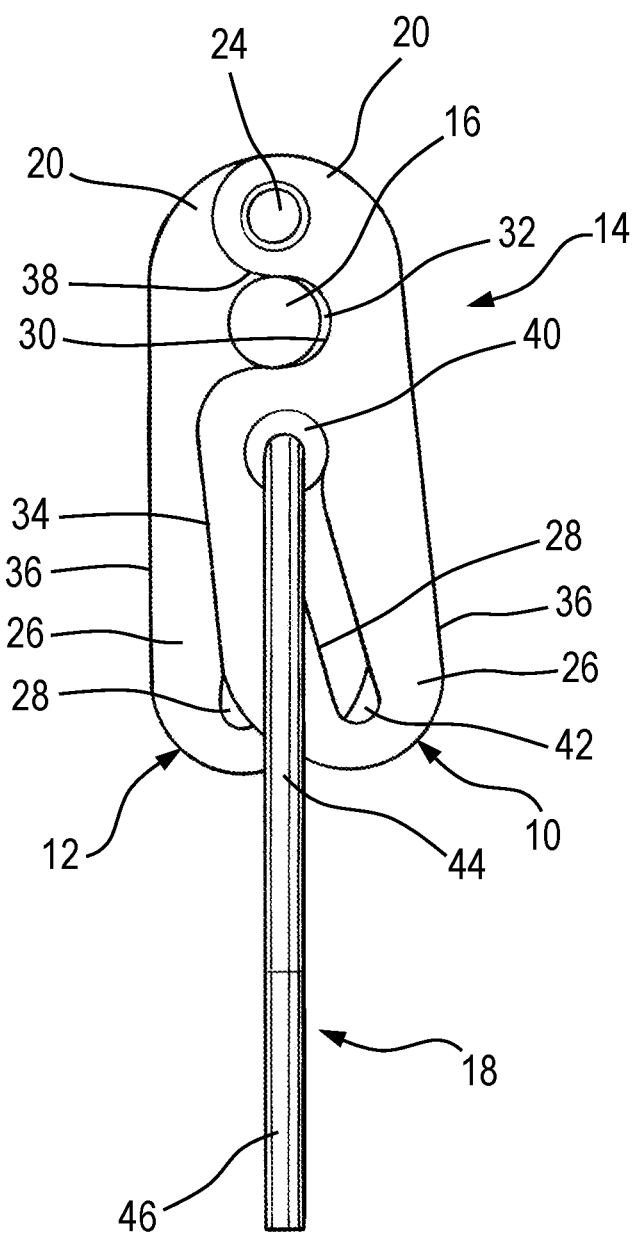
FIG. 5 is a front view showing the first and second suspension members in a released position.
Figure 6:
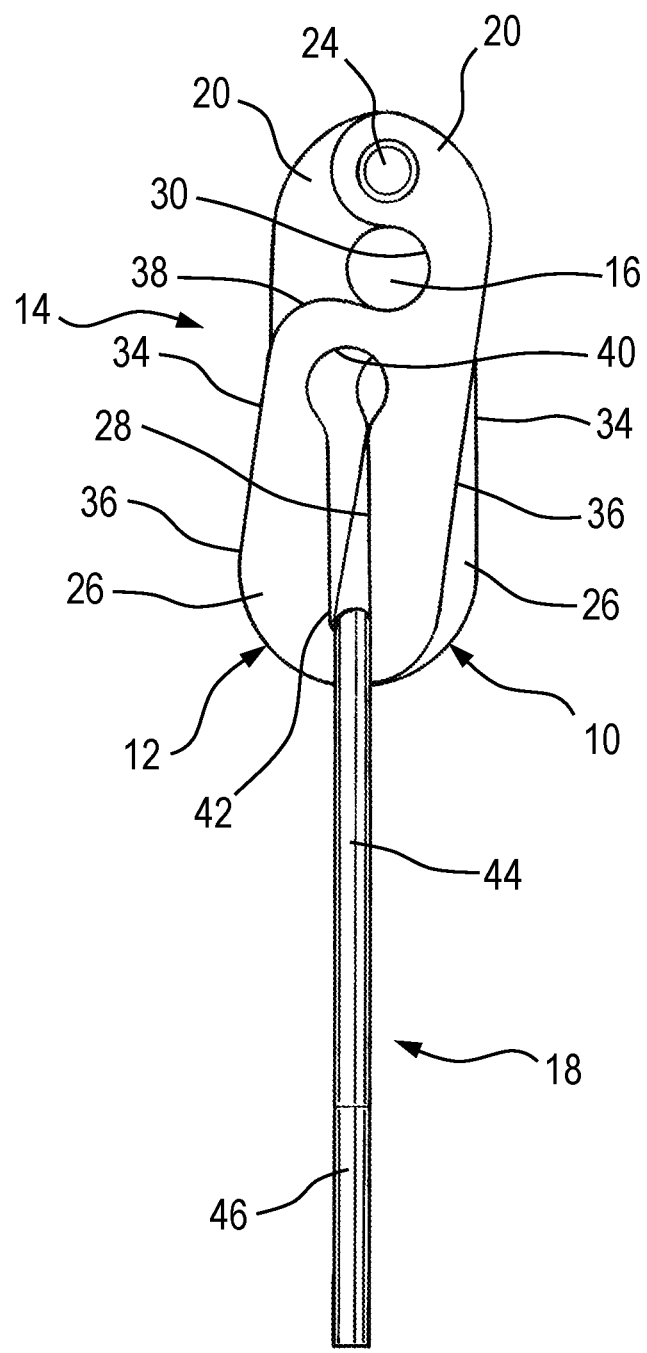
FIG. 6 is a front view showing the first and second suspension members in a clamping position.

The first and second suspension members 10, 12 are pivotally movable towards each other, as shown by the arrows X in FIG. 4, from a released position of the first and second suspension members 10, 12 (shown in FIG. 5) to a clamping position of the first and second suspension members 10, 12 (shown in FIG. 6).

The pivoting movement of the first and second suspension members 10, 12 causes a closing movement of the clamping recesses 30. This closing movement closes the clamping region 32, and causes the elongate article 16 to be clamped by the first and second suspension members 10, 12 in the clamping region 32.

Each of the first and second suspension members 10, 12 has a leading edge 34 and a trailing edge 36 opposite the leading edge 34. The leading edge 34 of each of the first and second suspension members 10, 12 leads the respective first and second suspension members 10, 12 when the first and second suspension members 10, 12 are moved to their clamping position.

Each clamping recess 30 extends inwardly of the leading edge 34 of the respective first and second suspension members 10, 12. A gap 38 for each clamping recess 30 is defined in each leading edge 34 to provide communication between the space within the recess and the outside of the recess through the leading edge 34.

The elongate aperture 28 of each of the first and second suspension members 10, 12 has a proximal end 40 closest to the clamping recess 30, and a distal end 42 furthest from the clamping recess 30. Each elongate aperture 28 extends diagonally from the proximal towards the trailing edge 36 of the respective suspension member. Thus, in the embodiment shown, the distal end 42 is closer than the proximal end 40 to the trailing edge 36.

The elongate aperture 28 of each of the first and second suspension members 10, 12 extends diagonally relative to a straight line A-A through the centre of the respective pivot member 24 and the centre of gravity of the respective elongate aperture 28. Each of the aforesaid straight lines A-A also extends through the respective clamping recess 30.

Thus, in use, when the looped region 44 is arranged at the proximal ends 40 of both of the apertures 28, the elongate apertures 28 are inclined relative to the straight line A-A. When so arranged, the aperture 28 in the first suspension member 10 is inclined in the opposite direction to the aperture 28 in the second suspension member 12.

For each of the first and second suspension members 10, 12, the angle between the elongate aperture 28 and the aforesaid straight line A-A may be substantially 175°.

Referring to FIGS. 4 and 5, when the first and second suspension members 10, 12 are in the released position, and the proximal ends 40 of the elongate apertures 28 are aligned with each other. The connecting arrangement 18 can be inserted through the aligned proximal ends 40. The connecting arrangement 18 is in the form of a wire, wire rope, cable or the like formed into a looped region 44 at an upper end of a main portion 46 thereof.

As shown in FIGS. 4 to 6, the looped region 44 extends through the elongate apertures 28 defined by the suspension members 12, 14. The opposite lower end (not shown) of the connecting arrangement 18 is attached to a load, such as a contact wire of the overhead electrical cable system of the railway line, or a component of an agricultural or industrial cable system. This load has the effect of applying a downward force on the connecting arrangement 18, as indicated by the arrow Y, thereby pulling the looped region 44 downwardly along the elongate apertures 28 of both of the first and second suspension members 10, 12.

The looped region 44 is moved by the downward force Y from the proximal end 40 of each elongate aperture 28, as shown in FIG. 5, to the distal end 42, as shown in FIG. 6. This movement has the effect of pivoting the first and second suspension members 10, 12 in the directions indicated by the arrows X, from the released position shown in FIG. 5 to the clamping position shown in FIG. 6.

In the clamping position of the first and second suspension members 10, 12, the elongate article 16 is clamped in the clamping region 32, and the distal ends 42 of the elongate apertures 28 are aligned with each other.

Figure 7:
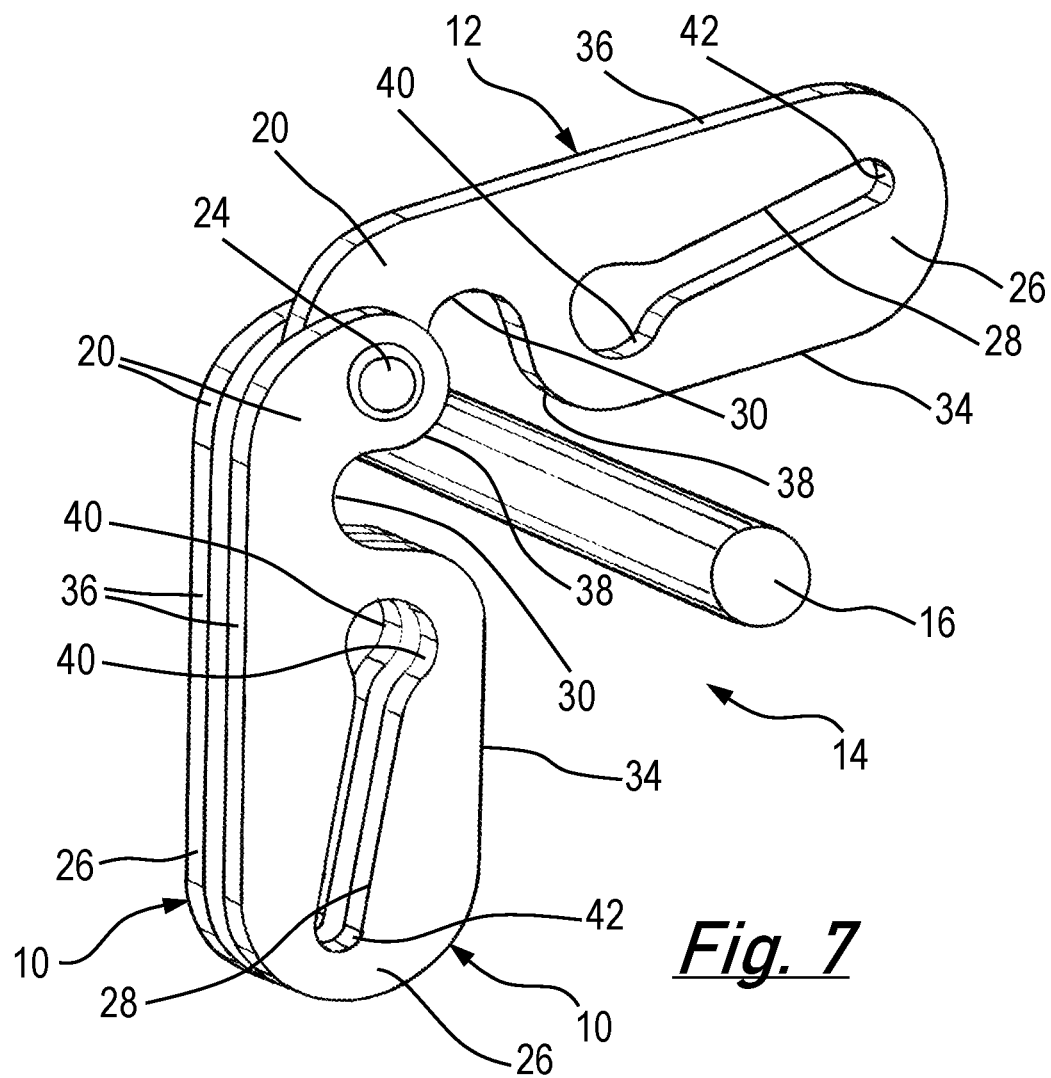
FIG. 7 is a perspective view of showing the mounting of the suspension assembly on a support.

In use, the suspension assembly 14 is mounted on the elongate article 16 by arranging the first and second suspension members 10, 12 in a splayed position, as shown in FIG. 7. In the splayed position, the second suspension member 12 is positioned above both of the first suspension members 10. The first suspension members 10 can then be arranged on the elongate article 16, with the elongate article 16 being received into the clamping recesses 30 of each of the first suspension members 10 via the gaps 38.

The second suspension member 12 can then be closed onto the elongate article 16, by pivoting the second suspension member 12 from its splayed position. The elongate article 16 is received in the clamping recess 30 of the second suspension member 12 via the gap 38. This mounts the suspension assembly 14 on the elongate article 16 in the released position of the first and second suspension members 10, 12, as shown in FIGS. 2 and 4. Therefore, the embodiment described herein can be retrofitted on overhead electrical cables for railway lines. The embodiment described herein may also be fitted or retrofitted in agricultural situations to provide crop support.

In the released position, the proximal ends 40 of the elongate apertures 28 are aligned with each other, as shown in FIGS. 2 and 3. In FIG. 2, the elongate article 16 is shown in broken lines. The elongate article 16 is omitted from FIG. 3 for reasons of clarity.

The upper end region of the connecting arrangement 18 is then threaded through the proximal ends 40 of the elongate apertures, and secured to the main portion 46 of the connecting arrangement 18 by a suitable means known in the art to form the looped region 44.

The lower end of the connecting arrangement 18 is secured lower contact wire of the overhead electrical cable system, or to a horizontal wire in a crop support system. This applies a downward force on the connecting arrangement 18, thereby pulling the looped region 44 downwardly along the elongate apertures 28 of the first and second suspension members 10, 12 to the distal ends 42 thereof.

The downward movement of the looped region 44 along the elongate apertures 28 moves the proximal ends 40 into alignment with each other, thereby effecting the closing movement of the clamping recesses 30. This causes the elongate article 16 to be clamped by the first and second suspension members 10, 12 within the clamping recesses 30.

Various modifications can be made without departing from the scope of the invention. For example, the looped region 44 need not be formed at one end, but could be the connecting arrangement 18 folded in half, so that the looped region 44, in effect, extends the whole length of the connecting arrangement 18.

In another variation, the suspension assembly may comprise a single first suspension member and a single second suspension member. An example of such a suspension assembly, generally designated 114, is shown in FIGS. 8 to 15.

The suspension assembly 114 shown in FIGS. 8 to 15 comprises many of the features of the suspension assembly 14 shown in FIGS. 1 to 7. These features are designated with same reference numerals as the corresponding features in FIGS. 1 to 7.

The suspension assembly 114 shown in FIGS. 8 to 15 differs from the suspension assembly 14 in that the suspension assembly 114 comprises a first suspension member 10, which is the same as the suspension member 10 shown in FIGS. 1 to 7. The suspension assembly 114 further includes a second suspension member 112.

The second suspension member 112 defines an opening 116 at the proximal end 40 of the elongate aperture 28. The opening 116 provides communication into the aperture 28, and allows the looped region 44 of the connecting arrangement 18 to be received in the aperture 28.

The suspension assembly 114 can be supplied with the connecting arrangement 18 extending through the aperture 28 defined by the first suspension member 10. The looped region 44 may be pre-formed from the region of the connecting arrangement 18 extending through the aperture 28 in the first suspension member 10.

Figure 10:
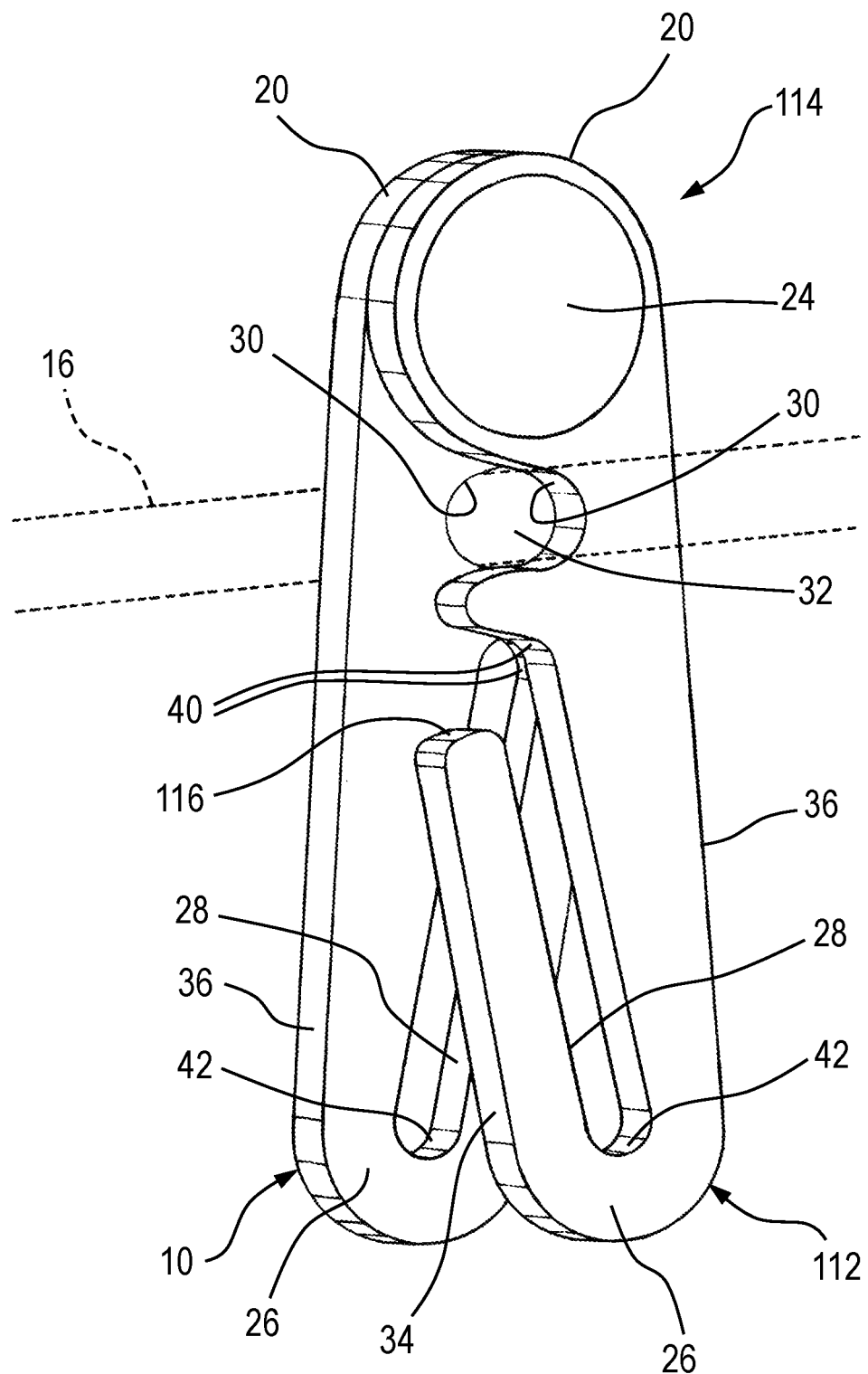
FIG. 10 is perspective view of the suspension assembly comprising the first and second suspension members shown in FIGS. 8 and 9.
Figure 11:
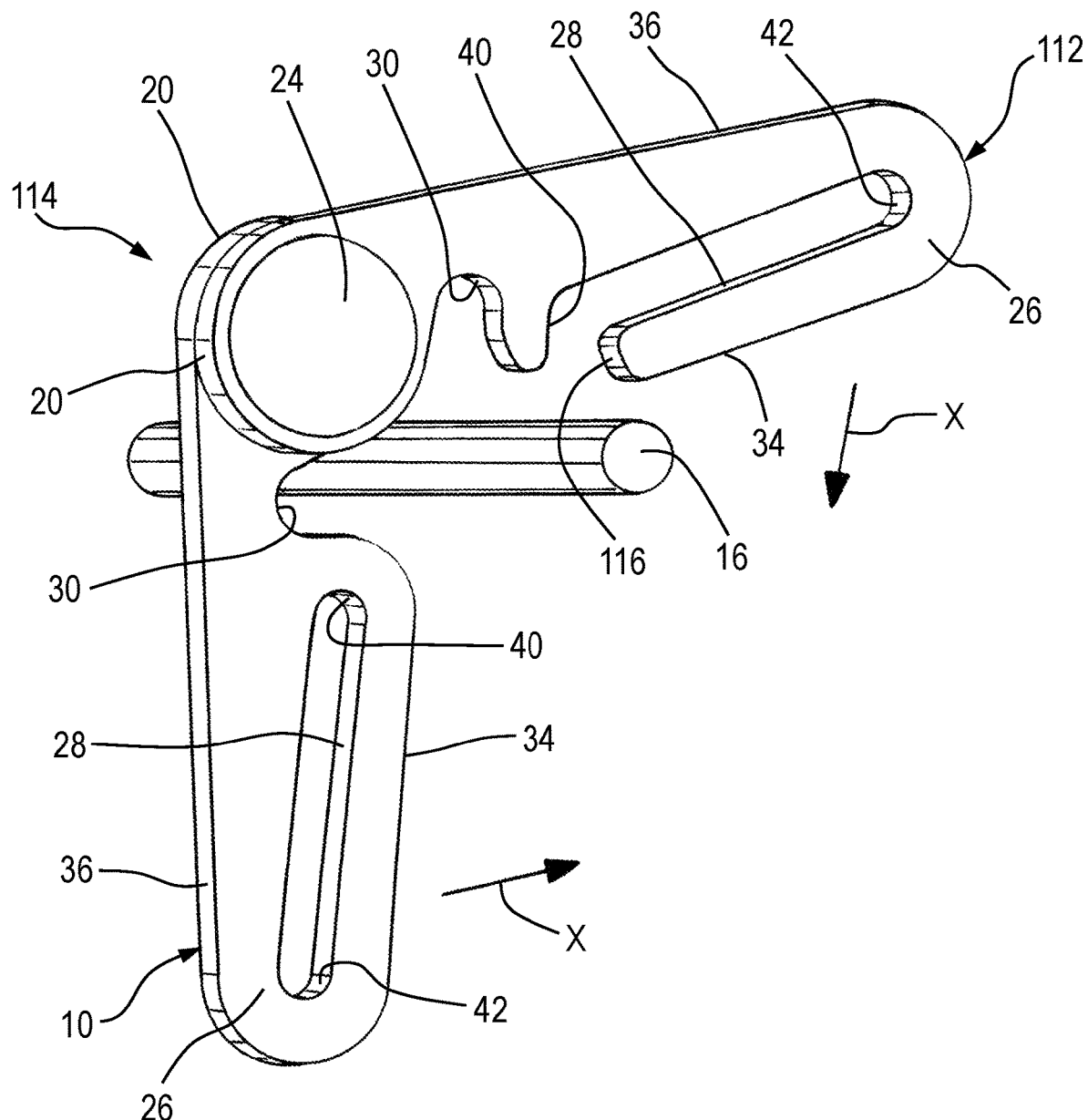
FIG. 11 is a perspective view of showing the mounting of the further suspension assembly on a support.
Figure 12:
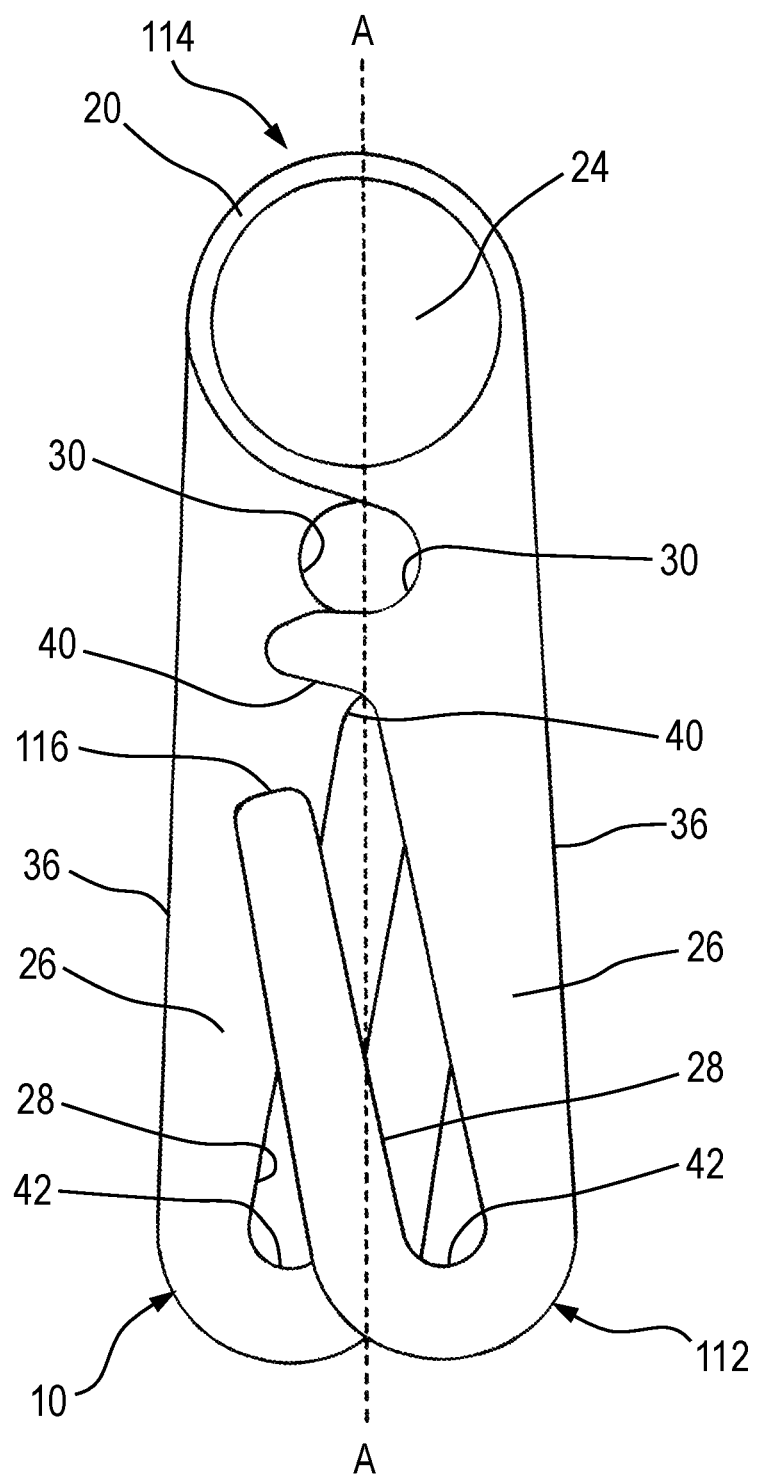
FIG. 12 is a front view of the suspension assembly shown in FIGS. 10 and 11.

The first and second suspension members 10, 112 are moved to the splayed position shown in FIG. 11. The elongate article 16 is then received by the clamping recesses 30. The first and second suspension members 10, 112 are then closed, as shown by the arrows X in FIG. 11, so that the clamping recesses 30 form the clamping region 32 to hold the elongate article 16 between the first and second suspension members 10, 112. The closed position of the first and second suspension members 10, 112 is shown in FIGS. 10 and 12.

Figure 13:
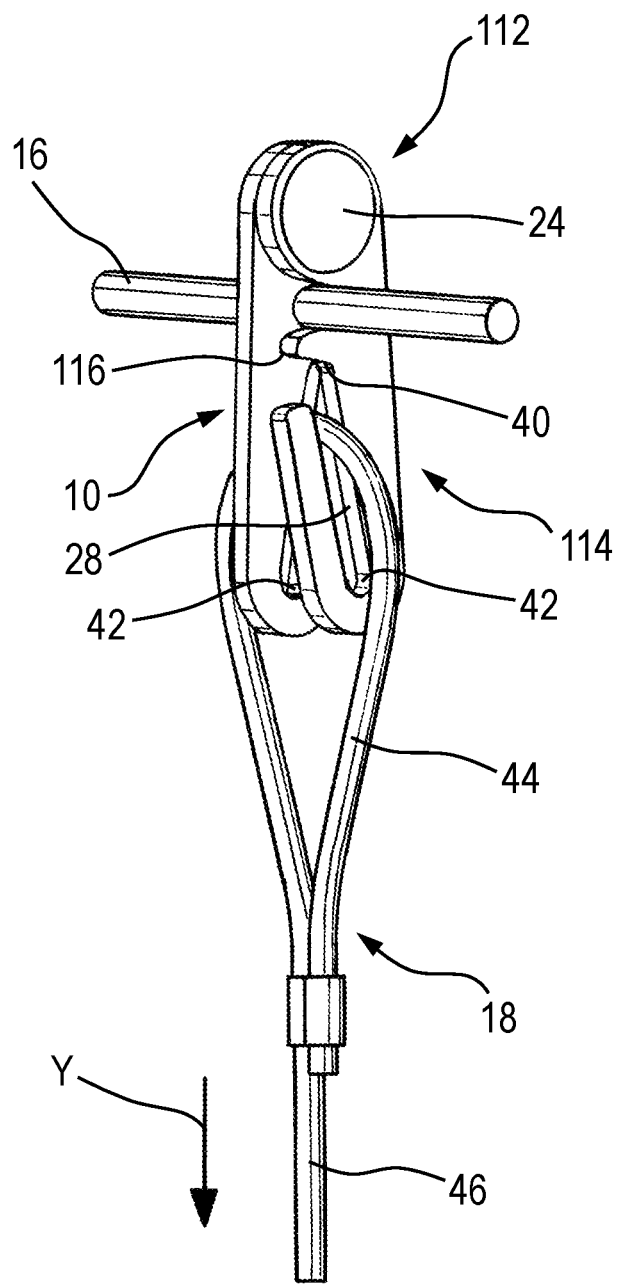
FIG. 13 is perspective view of the suspension assembly on the support, showing the first and second suspension members in a released position.
Figure 14:
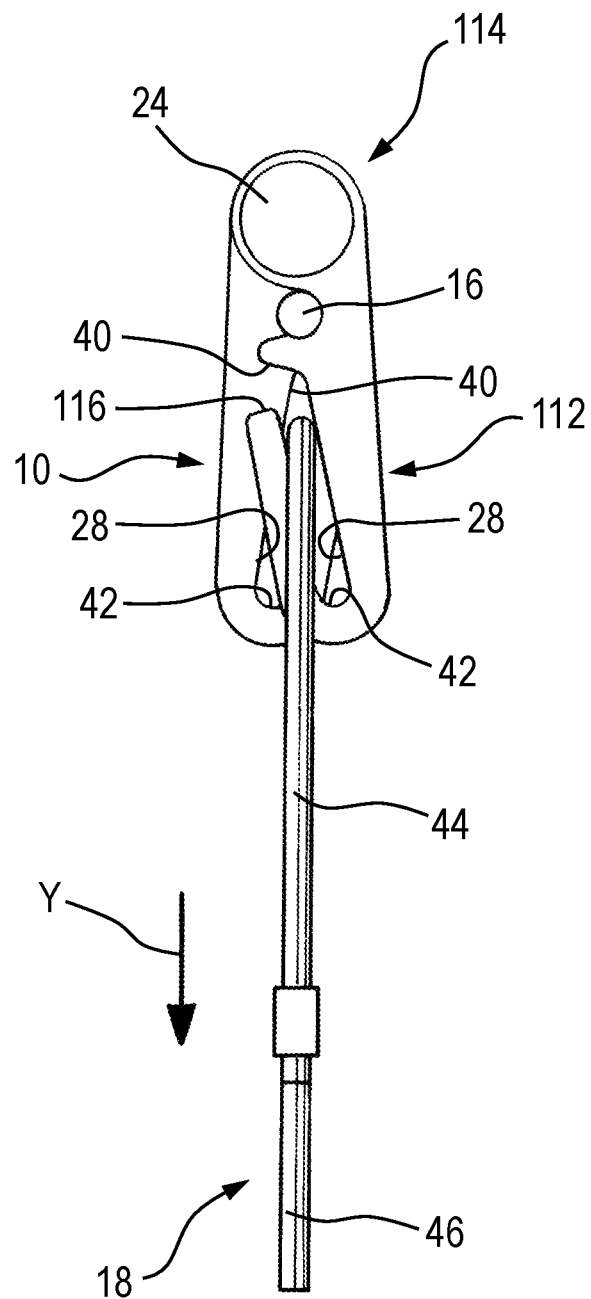
FIG. 14 is a front view of the further suspension assembly, in which the first and second suspension members are in a released position.

The pre-formed looped region 44 of the connecting arrangement 18 has been previously arranged to extend through the aperture 28 in the first suspension member 10. Referring to FIGS. 13 and 14, a portion of the looped region 44 is then inserted via the opening 116 into the proximal end 40 of the aperture 28 in the second suspension member 112.

The downward force Y on the connecting arrangement 18 pulls the looped region 44 downwardly along the elongate apertures 28 of both of the first and second suspension members 10, 112.

Figure 15:
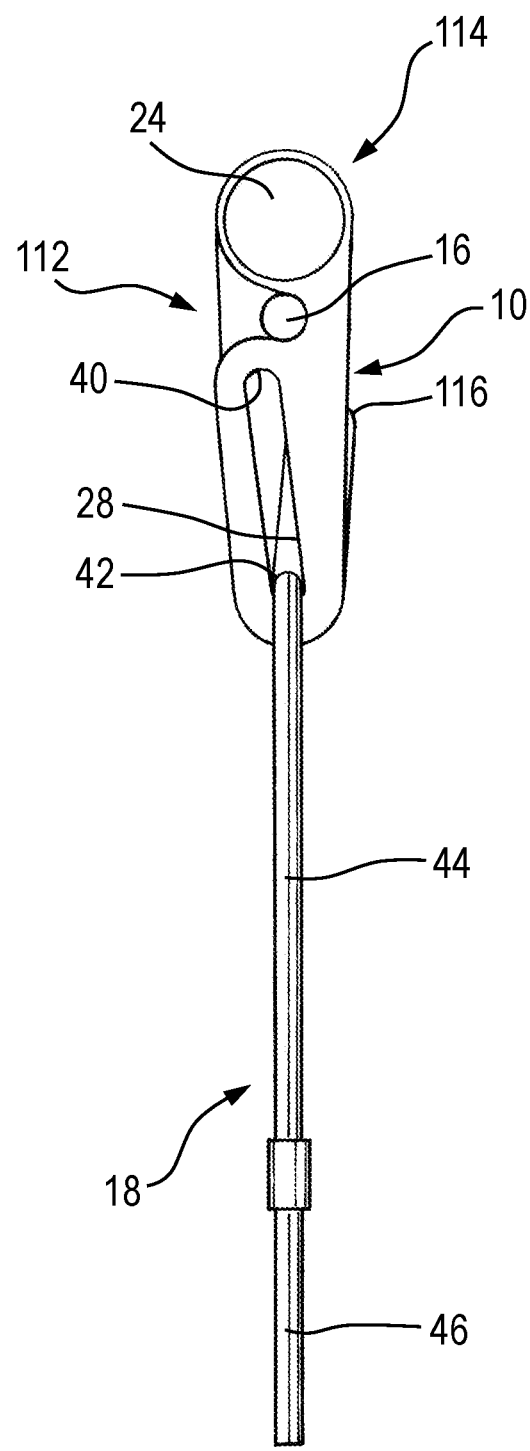
FIG. 15 is a rear view of the further suspension assembly, in which the first and second suspension members are in a clamping position.

The looped region 44 is moved by the downward force Y from the proximal ends 40 of both elongate apertures 28, as shown in FIGS. 13 and 14, to the distal ends 42, as shown in FIG. 15. This movement has the effect of pivoting the first and second suspension members 10, 12 in the directions indicated by the arrows X, from the released position shown in FIGS. 13 and 14 to the clamping position shown in FIG. 15.

In the clamping position of the first and second suspension members 10, 12, the distal ends 42 of the elongate apertures 28 are aligned with each other, and the elongate article 16 is clamped in the clamping region 32 provided by the clamping recesses 30 of the first and second suspension members 10, 12.

There is thus provided a suspension assembly 14, 114 which can be clamped to an elongate article 16 in the form of a catenary. A connecting arrangement 18 with a looped region 44 extends from the suspension assembly 14, 114. In one use of the suspension assembly 14, 114 the connecting arrangement 18 is in the form of a dropper. The dropper can be suspended from the catenary by means of the suspension assembly. In this use of the suspension assembly 14, 114, the load on the connecting arrangement 8 is provided by the weight on the cable.

In another use of the suspension assembly 14, 114, the connecting arrangement 18 is in the form of a cable attached to an upper support. The looped region 44 is provided at the lower end of the cable. Thus, the suspension assembly 14, 114 suspends the catenary from the cable. In this use of the suspension assembly 14, 114, the load on the connecting arrangement 8 is provided by the tension in the cable, said, said tension being caused by the weight of the catenary.

The above described suspension assemblies 14, 114 provide the advantages that the suspension assemblies can be installed without the use of tools, and that the suspension assemblies 14, 114 are self-locking in that the suspension members 10, 12 move automatically to the clamping position.

Figure 16:
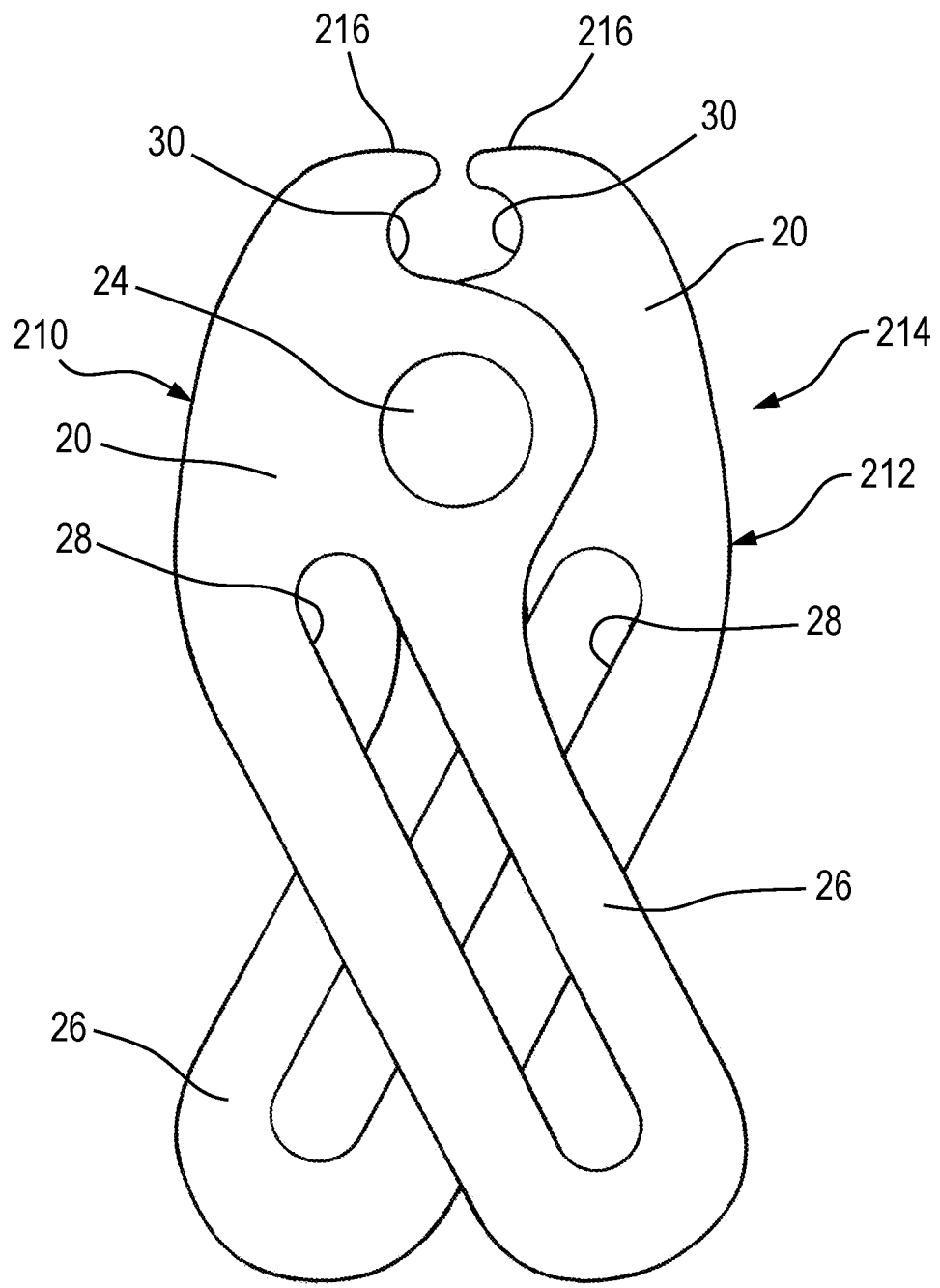
FIGS. 16 and 17 show further versions of the suspension assembly.
Figure 17:
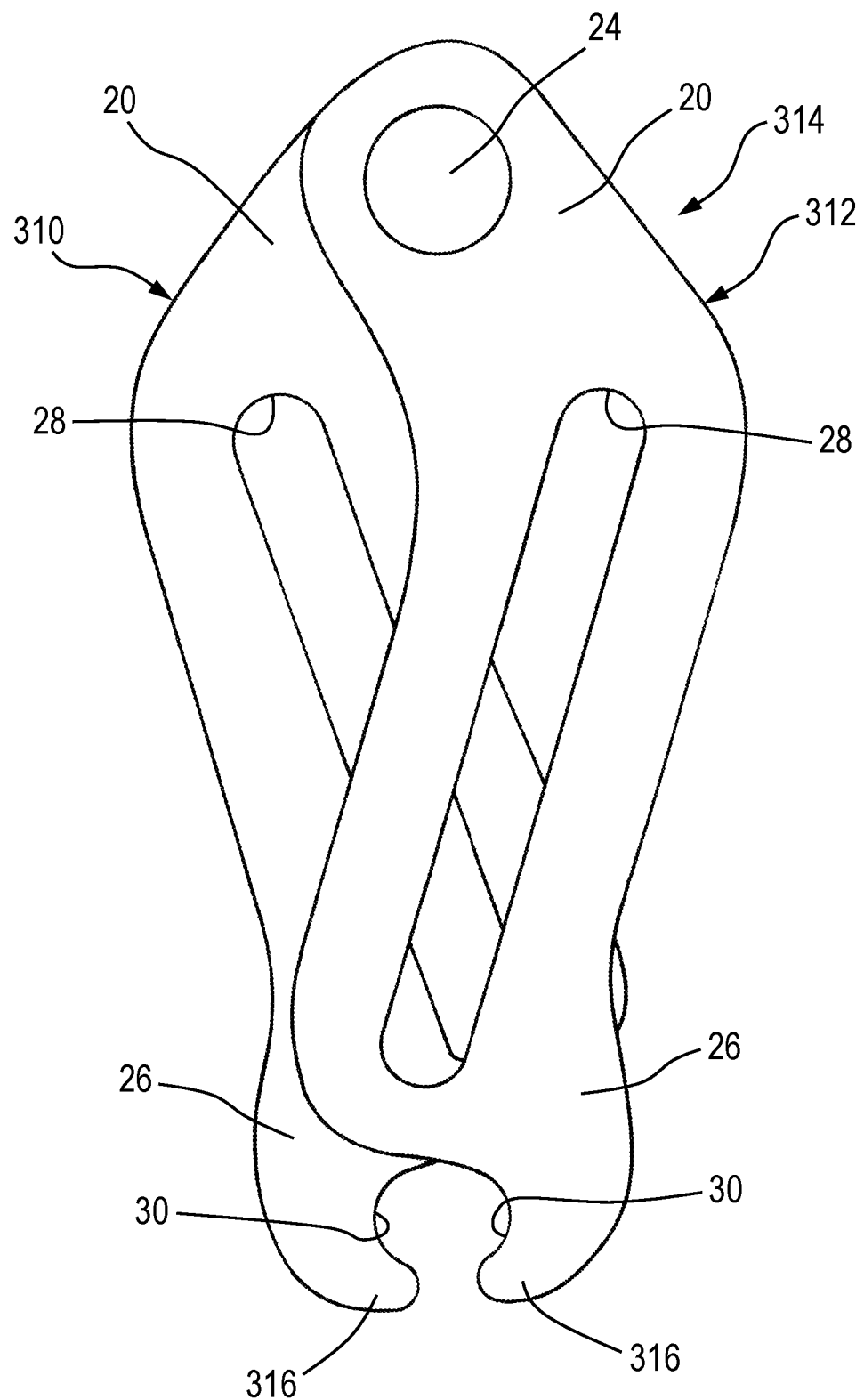

FIGS. 16 and 17 show further versions of the suspension assembly, generally designated 214 in FIG. 16, and 314 in FIG. 17. The suspension assemblies 214 and 314 shown in FIGS. 16 and 17 comprise many of the features of the suspension assembly 14 shown in FIGS. 1 to 7. These features are designated with same reference numerals as the corresponding features in FIGS. 1 to 7.

The suspension assembly 214 shown in FIG. 16 differs from the suspension assembly 14 in that the suspension assembly 214 comprises first and second suspension members 210, 212. In each of the suspension members 210, 212, the pivot hole 22 of each of the first and second suspension members 210, 212 is defined, and the pivot member 24 provided, between the respective clamping recess 30 and the respective elongate aperture 28. Each clamping recess 30 is provided at one end region 216 of the suspension member 210, 212, adjacent the respective pivot hole 22.

In use, the clamping recess 30 is provided at the upper end region 216 of the upper region 20 each of the suspension members 210, 212.

A version of the suspension members 210, 212 may be provided in which the elongate aperture 28 of one of the suspension members 210, 212 has an opening 116 at the proximal end 40 of the elongate aperture 28. In this version, the pivot hole 22 is provided adjacent the opening 116 between the elongate aperture 28 and the clamping recess 30.

The suspension assembly 314 shown in FIG. 17 differs from the suspension assembly 14 in that the suspension assembly 314 comprises first and second suspension members 310, 312. In each of the suspension members 310, 312, the elongate apertures 28 of each of the first and second suspension members 310, 312 is defined between the respective clamping recess 30 and the respective pivot hole 22 with the pivot member 24. Each clamping recess 30 is provided at the end region 316 of the suspension member 310, 312 adjacent the elongate apertures 28.

In use, the clamping recess 30 is provided at the lower end region 316 of the lower region 26 of each of the suspension members 310, 312.

A version of the suspension members 310, 312 may be provided in which the elongate aperture 28 of one of the suspension members 310, 312 has an opening 116 at the proximal end 40 of the elongate aperture 28.

Figure 8:
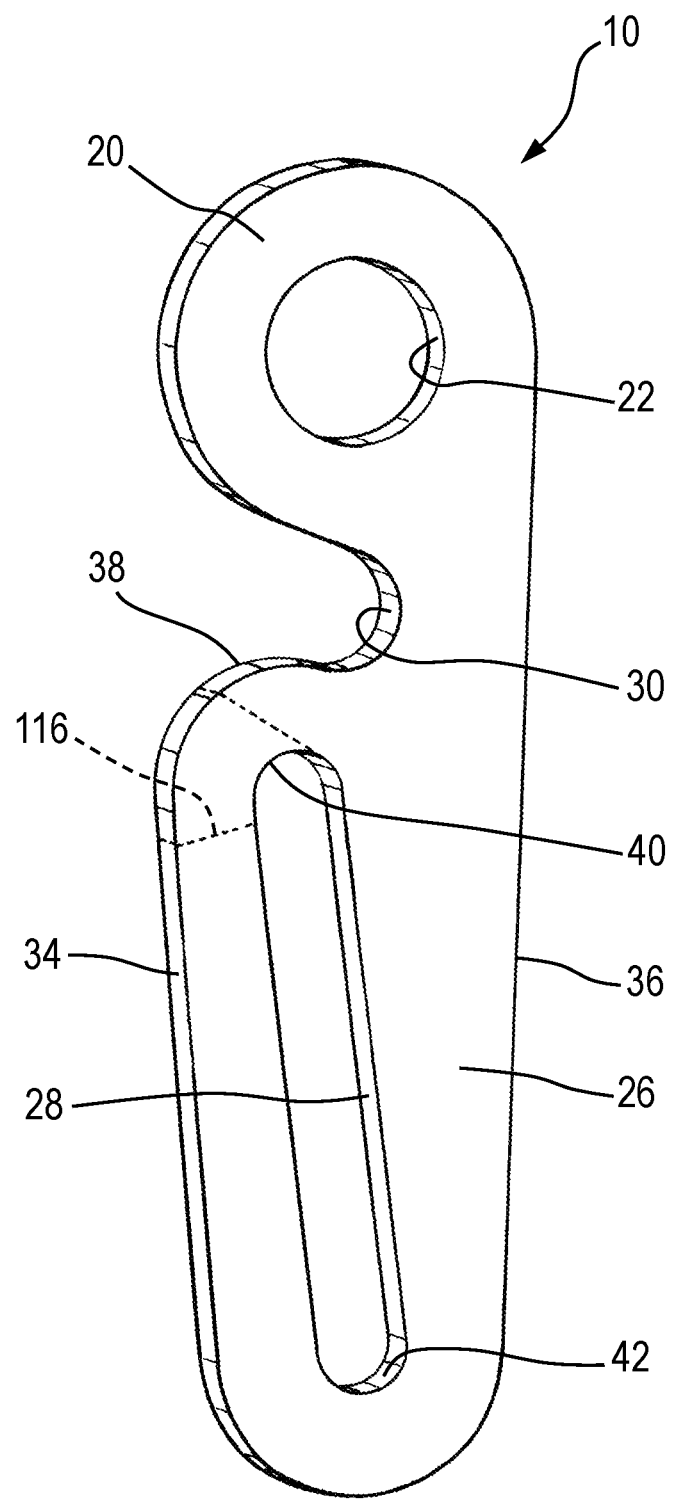
FIG. 8 is a perspective view of a first suspension member of a further suspension assembly.
Figure 9:
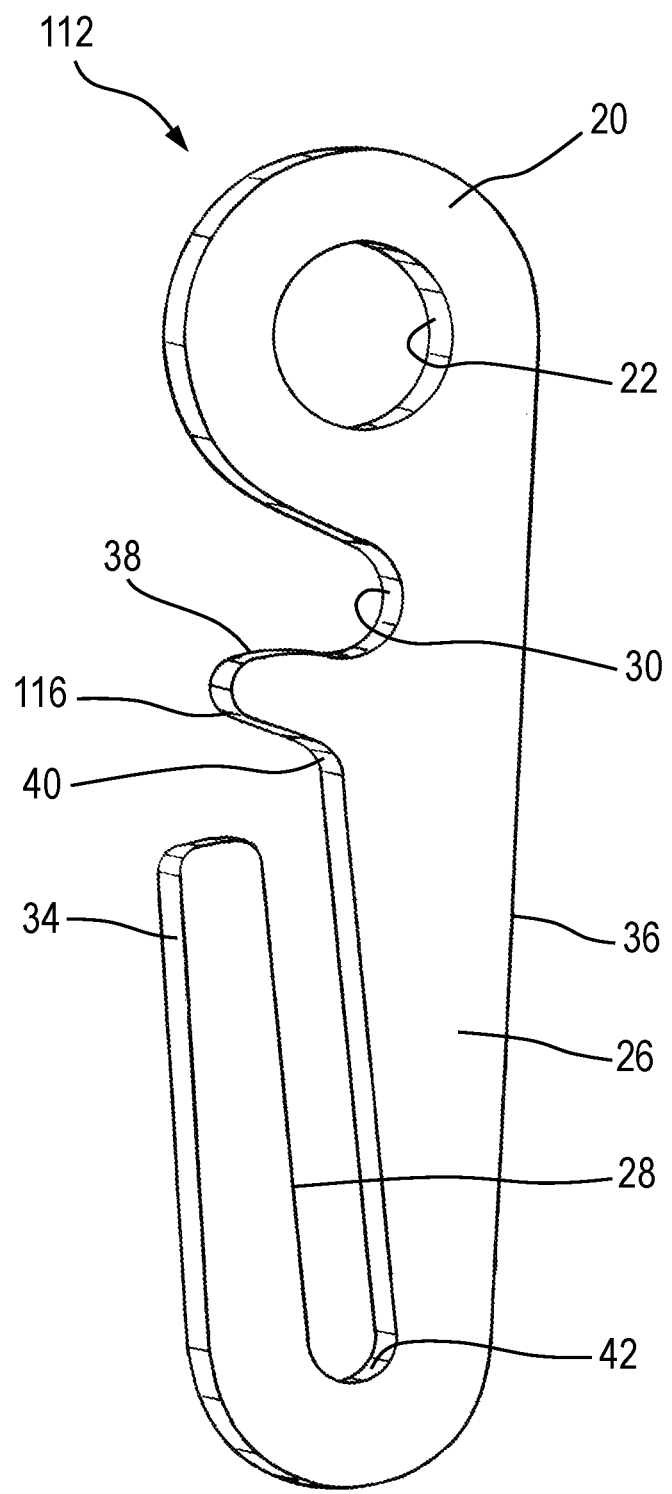
FIG. 9 is a perspective view of a second suspension member of the further suspension assembly.

In a further modification, the first suspension member 10, shown in FIG. 8, could be provided with an opening 116 (indicated schematically by broken lines in FIG. 8), so that the first suspension member 10 is the same as the second suspension member 112. Thus, each of the first and second suspension members 10, 112 of the suspension assembly 114 is provided with a respective opening 116. This allows a looped region 44 of the connecting arrangement 18 to be used without the need to pre-form the looped region 44 through one of the apertures 28.

The invention claimed is:

1. A suspension assembly comprising:
   first and second suspension members extending across each other; and
   a pivot member on which the first and second suspension members are pivotally mounted;
   each of the first and second suspension members defining a clamping recess;
   the first suspension member defining a first elongate aperture, and the second suspension members defining a second elongate aperture, each of said first and second elongate apertures being provided to effect pivoting movement of at least one of the first and second suspension members to clamp an article in the clamping recesses;
   each elongate aperture having proximal and distal ends, the proximal end being closest to the pivot member; and
   wherein the second suspension member defines an opening at the proximal end of the second elongate aperture, the opening allowing at least a portion of an elongate member to enter the second elongate aperture, the second suspension member comprising first and second opposite faces and an edge extending from the first face to the second face, wherein the second aperture extends from the first face to the second face, and the opening extends from the edge to the aperture.

2. A suspension assembly according to claim 1, wherein each of the first and second suspension members has a leading edge and a trailing edge opposite the leading edge, the leading edge of each of the first and second suspension members leading the respective suspension member when the suspension members are moved to the clamping position of the first and second suspension members.

3. A suspension assembly according to claim 1, wherein the first and second suspension members are pivotally movable from a released position of the first and second suspension members to a clamping position of the first and second suspension members, said pivoting movement of the first and second suspension members to the clamping position effecting a closing movement of the clamping recesses.

4. A suspension assembly according to claim 3, wherein each elongate aperture extends from the proximal end towards the trailing edge of the respective suspension member.

5. A suspension assembly according to claim 4, wherein the elongate member is receivable through the first and second elongate apertures, the elongate member being movable along the first and second elongate apertures to effect said pivoting movement of the first and second suspension members to the clamping position.

6. A suspension assembly according to claim 4, wherein the proximal and distal ends of the first elongate aperture are closed ends.

7. A suspension assembly according to claim 4, wherein the proximal ends of the first and second elongate apertures are in an aligned condition in the released position of the suspension members, whereby the aligned proximal ends of the elongate apertures can receive a portion of the elongate member.

8. A suspension assembly according to claim 7, wherein the distal ends of the first and second elongate apertures are in an aligned condition in the clamping position of the suspension members, whereby the aligned distal ends of the elongate apertures can receive a portion of the elongate member.

9. A suspension assembly according to claim 1, wherein when the first and second suspension members move from the aligned condition of said proximal ends to the aligned condition of said distal ends, the first and second suspension members move from the released position to the clamping position.

10. A suspension assembly according to claim 7, wherein movement of the suspension members from the aligned condition of said proximal ends to the aligned condition of said distal ends is effected by movement of the elongate member along the first and second elongate apertures of each of the first and second suspension members from said proximal ends to said distal ends.

11. A suspension assembly according claim 10, wherein movement of the elongate member along the first and second elongate apertures from the proximal ends to the distal ends effects pivoting movement of the first and second suspension members relative to each other.

12. A suspension assembly according to claim 11, wherein said pivoting movement of the first and second suspension members moves the distal ends of the elongate apertures into alignment with each other to allow the elongate member to move to the distal end.

13. A suspension assembly according to claim 1, wherein the clamping recesses are arranged to be aligned with each other to provide a clamping region defined by the first and second suspension members, said alignment of the clamping recesses allowing the clamping members to hold the article in the clamping region.

14. A suspension assembly according to claim 1, wherein the pivot member is provided at one end region of the respective first and second suspension members, and each elongate aperture is defined in an opposite end region of the respective first or second suspension members.

15. A suspension assembly according to claim 1, wherein the clamping recesses face in opposite directions, and each of the first and second suspension members has an outer edge defining a gap to provide communication between the region within the clamping recess and the region external thereof.

16. A suspension assembly according to claim 1, wherein the first elongate aperture is angled in the opposite direction to the second elongate aperture.

17. A support assembly comprising:
a suspension assembly comprising first and second suspension members extending across each other, and a pivot member on which the first and second suspension members are pivotally mounted;
each of the first and second suspension members defining a clamping recess for receiving an article;
the first suspension member defining a first elongate aperture and the second suspension member defining a second elongate aperture, each of said first and second elongate apertures being provided to effect pivoting movement of at least one of the first and second suspension members to clamp the article in the clamping recesses;
each elongate aperture having proximal and distal ends, the proximal end being closest to the pivot member; and
the support assembly further including an elongate member extending through the first elongate aperture;
wherein the second suspension member defines an opening at the proximal end of the second elongate aperture, the opening allowing at least a portion of the elongate member to enter the second elongate aperture, the second suspension member comprising first and second opposite faces and an edge extending from the first face to the second face, wherein the second aperture extends from the first face to the second face, and the opening extends from the edge to the aperture.

18. A support assembly according to claim 17, wherein the elongate member is movable along the elongate apertures to effect said pivoting movement of the first and second suspension members to the clamping position.

19. A support assembly according to claim 17, wherein the elongate member has a looped region extending through the aperture of the first suspension member.

* * * * *